United States Patent
Smith et al.

(10) Patent No.: US 9,832,318 B1
(45) Date of Patent: Nov. 28, 2017

(54) MESSAGE MANAGEMENT AND NOTIFICATION SYSTEM

(71) Applicant: Securus Technologies, Inc., Dallas, TX (US)

(72) Inventors: Matthew Smith, McKinney, TX (US); Alexander Noland, North Richland Hills, TX (US)

(73) Assignee: Securus Technologies, Inc., Carrollton, TX (US)

( * ) Notice: Subject to any disclaimer, the term of this patent is extended or adjusted under 35 U.S.C. 154(b) by 0 days.

(21) Appl. No.: 15/376,340

(22) Filed: Dec. 12, 2016

(51) Int. Cl.
*H04M 1/64* (2006.01)
*H04M 3/533* (2006.01)
*H04L 29/08* (2006.01)
*H04L 12/58* (2006.01)

(52) U.S. Cl.
CPC ...... *H04M 3/53366* (2013.01); *H04L 67/146* (2013.01); *H04M 3/53333* (2013.01); *H04L 51/32* (2013.01)

(58) Field of Classification Search
CPC .................. H04M 3/53366; H04L 67/146
See application file for complete search history.

(56) References Cited

U.S. PATENT DOCUMENTS

| 2003/0198325 | A1* | 10/2003 | Bayne | H04M 15/08 379/114.21 |
| 2008/0317222 | A1* | 12/2008 | Griggs | A61K 9/2054 379/88.14 |
| 2011/0317685 | A1 | 12/2011 | Torgersrud et al. | |
| 2014/0044242 | A1* | 2/2014 | Hodge | H04M 3/533 379/68 |
| 2015/0227944 | A1* | 8/2015 | Comey | G06Q 30/018 705/3 |
| 2015/0227989 | A1* | 8/2015 | Chattopadhyay | H04L 63/083 705/317 |
| 2015/0256671 | A1 | 9/2015 | Torgersrud et al. | |

* cited by examiner

*Primary Examiner* — Simon King
(74) *Attorney, Agent, or Firm* — Fogarty LLP

(57) ABSTRACT

Systems and methods provide a resident of a controlled-environment facility with voice messaging. The facility provides the resident with voice communication services. In response to a request by a resident for a voice communication with a non-resident, a call request to the non-resident may be initiated. In certain scenarios, the non-resident is unable to accept the call request. If a voice message is authorized, the resident is allowed to record a voice message for the non-resident. Certain restrictions may limit the resident to selecting from automated voice messages. A notification of the recorded voice message is dispatched to the non-resident. The notification identifies a unique link that directs the non-resident to a voice message retrieval system that allows the resident to retrieve and listen to the voice message recorded by the resident. The voice message recording remains under the control of the controlled-environment facility based on applicable security policies and procedures.

18 Claims, 5 Drawing Sheets

MESSAGE MANAGEMENT AND NOTIFICATION SYSTEM

TECHNICAL FIELD

The following description relates generally to communication services provided to residents of a controlled environment facility, and more particularly to messaging services provided to residents of a controlled environment facility.

BACKGROUND OF THE INVENTION

According to the International Centre for Prison Studies, the United States has the largest prison population in the world. By current estimates, over two million inmates are incarcerated in U.S. prisons. In general, inmates that have been convicted of felony offenses serve longer sentences in prisons (e.g., federal or state prisons), whereas inmates that have been convicted of misdemeanors receive shorter sentences that are typically served in jails (e.g., county jail). In addition, upon being detained by authorities, an inmate may serve significant periods of time incarcerated in a local jail while awaiting release on bond and, in some cases, while awaiting trial. During all of these periods of incarceration, an inmate may have opportunities to communicate with the outside world.

By allowing inmates to communicate with friends and family while incarcerated, the justice system aims to facilitate their transition back into society upon release. Traditional visitation sessions provided by controlled-environment facilities include telephone calls and in-person visits. More recently, technological advances have allowed controlled-environment facilities to provide other types of visitation sessions, including video conferences, email and online chat sessions.

Voice communication services provided to residents of controlled-environment facilities typically limit residents to placing outbound calls to non-residents of the controlled-environment facility. Residents typically are not allowed to receive calls. In addition, residents typically have limited access to communication devices and this access may be provided only according to strict schedules maintained by each individual controlled-environment facility. In some scenarios, voice visitation sessions between a resident and a non-resident may be scheduled for a time when the resident will have access to a communication device and when the non-resident can receive the call. However, in many instances, voice communications between a resident and non-resident depend on a non-resident being able to receive the resident's call at the time the resident afforded the opportunity to initiate a voice visitation session. Consequently, in many instances, a resident's voice visitation request is unsuccessful due to the inability of the non-resident to accept the resident's call request. This can be especially problematic in situations where an individual has been detained and needs to inform friends and family of the situation in order to arrange bail and to relay other important information.

BRIEF SUMMARY

According to various embodiments, methods and systems provide a resident of a controlled-environment facility with voice messaging. These methods and systems comprise: receiving from the resident a request for a voice communication with a non-resident of the controlled-environment facility; initiating a call request to the non-resident, wherein the call request is a dialed call directed to a phone number associated with the non-resident; determining that the non-resident has not accepted the call request; allowing the resident to record a voice message for the non-resident; and sending a notification of the voice message to the phone number associated with the non-resident, wherein the notification identifies the resident and wherein the notification includes a unique URL (Uniform Resource Locator) that directs the non-resident to a voice message retrieval system.

In various additional embodiments, the voice message retrieval system is maintained by the controlled-environment facility. In various additional embodiments, determining non-acceptance of the call request comprises failing to detect an answer to the dialed call within a predefined time interval. In various additional embodiments, the systems and methods further comprise determining whether the resident is allowed to communicate with the non-resident prior to initiating a call request to the non-resident. In various additional embodiments, the notification comprises at least one of: an SMS (Short Message Service) text message, an MMS (Multimedia Message Service) message, a push notification, an email, and a social networking message. In various additional embodiments, the unique URL expires after a predefined time interval. In various additional embodiments, the notification identifies the controlled-environment facility and identifies the resident as a person that is incarcerated at the controlled-environment facility. In various additional embodiments, the unique URL is configured to function only when selected using a device that has been assigned the phone number associated with the non-resident.

According to various embodiments, a method for providing a resident of a controlled-environment facility with voice messaging comprises: receiving from the resident a request for a voice communication with a non-resident of the controlled-environment facility; initiating a call request to the non-resident, wherein the call request is a dialed call directed to a phone number associated with the non-resident; determining that the non-resident has not accepted the call request; determining whether the resident is allowed to provide a spoken voice message; if the resident is not allowed to provide a spoken voice message, allowing the resident to select an automated voice message for the non-resident; and sending a notification of the voice message to the phone number associated with the non-resident, wherein the notification identifies the resident and wherein the notification includes a unique URL (Uniform Resource Locator) that directs the non-resident to a voice message retrieval system maintained by the controlled-environment facility.

In various additional embodiments, the resident is allowed to provide a spoken voice message is based on a privilege status of the non-resident within the controlled-environment facility. In various additional embodiments, the automated voice message comprises a computer-generated voice message that identifies the non-resident as an inmate of the controlled-environment facility. In various additional embodiments, the computer-generated voice message comprises bail and incarceration status information relating to the resident.

BRIEF DESCRIPTION OF THE DRAWINGS

Figure 1:
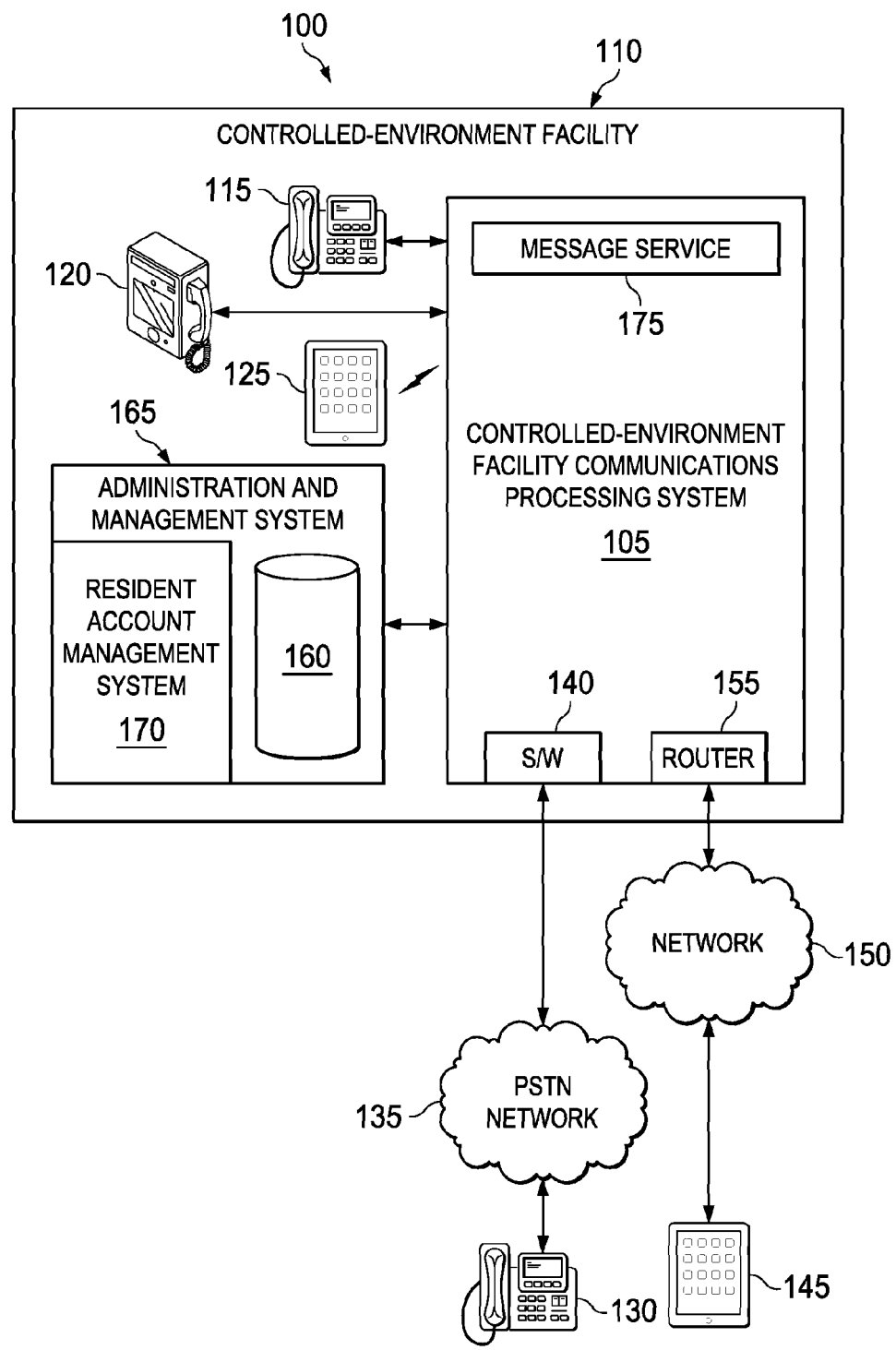

Having thus described the invention in general terms, reference will now be made to the accompanying drawings, which are not necessarily drawn to scale, and wherein:

FIG. 1 is a diagram illustrating certain components of a voice communication system for providing residents of a controlled environment facility with voice messaging services according to various embodiments.

Figure 2:
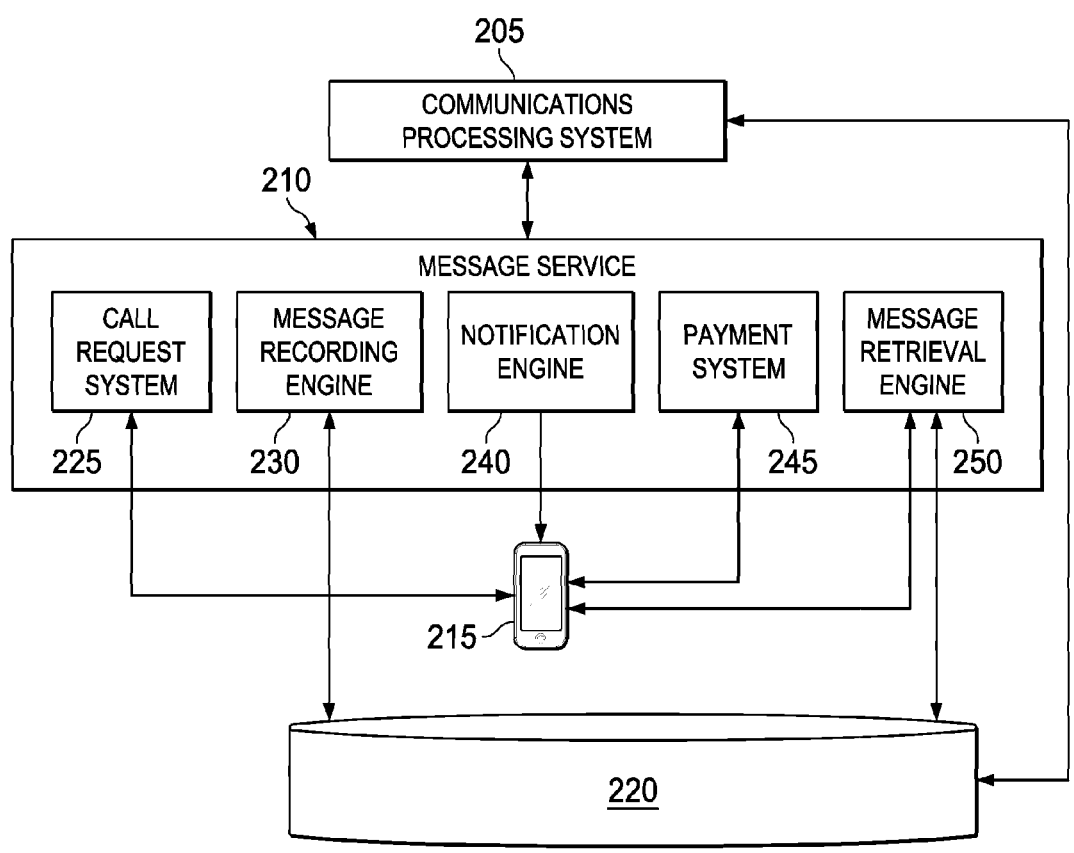

FIG. 2 is a diagram illustrating certain additional components of a voice communication system for providing residents of a controlled environment facility with voice messaging services according to various embodiments.

Figure 3:
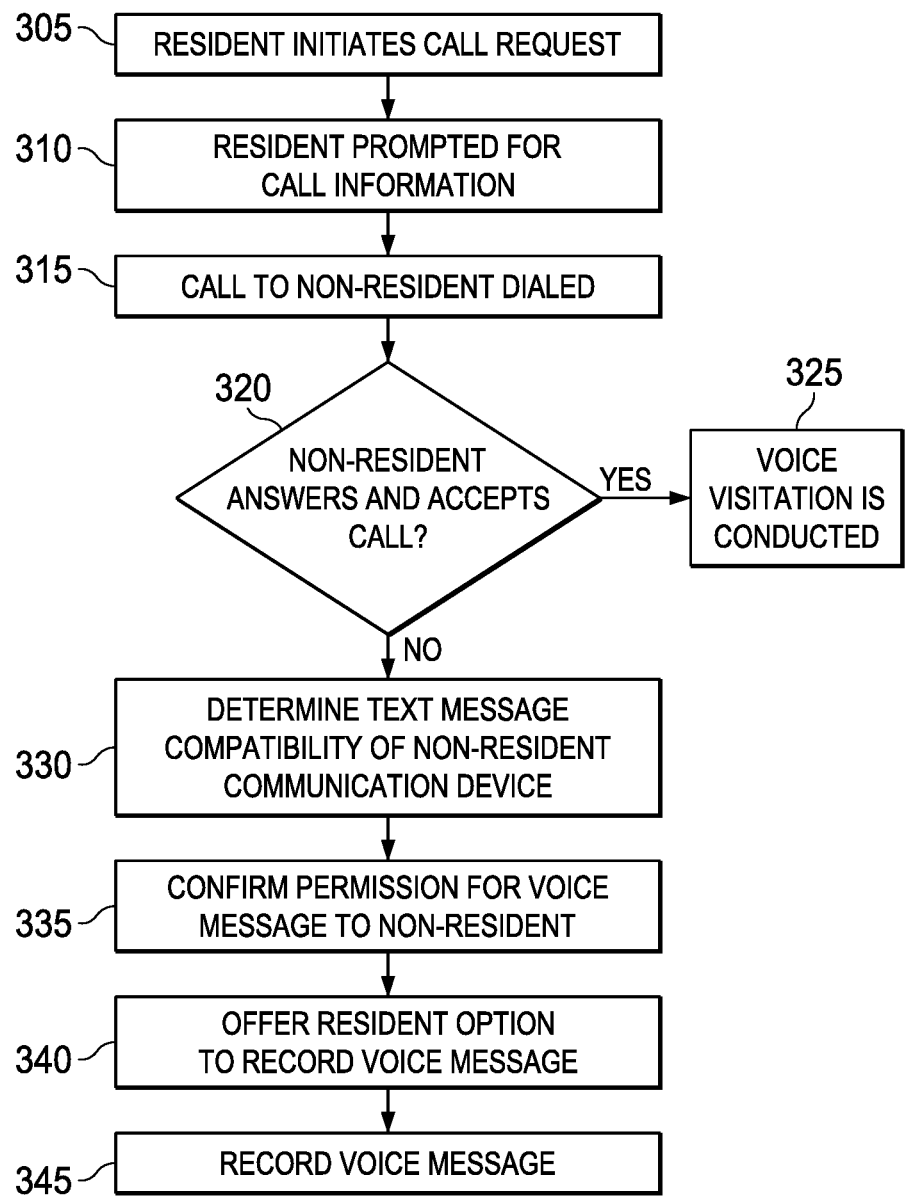

FIG. 3 is a flowchart diagram illustrating certain steps of process according to various embodiments for providing a resident of a controlled environment facility with a voice message service.

Figure 4:
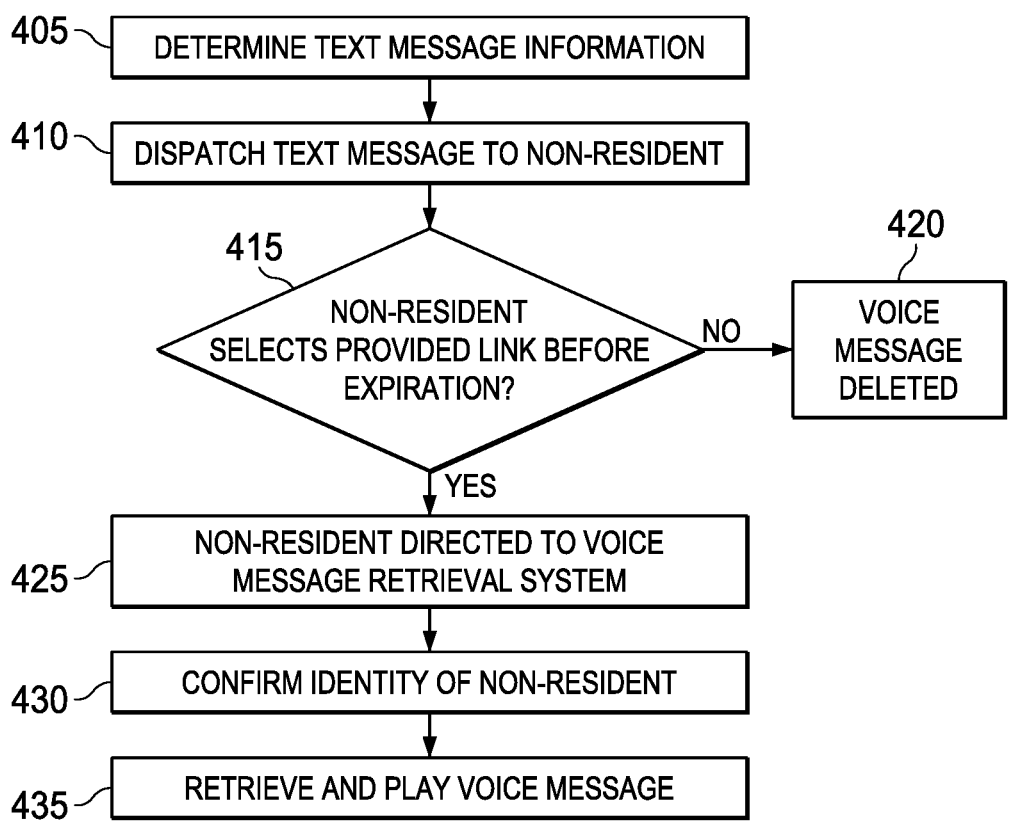

FIG. 4 is a flowchart diagram illustrating certain additional steps of process according to various embodiments for providing a resident of a controlled environment facility with a voice message service.

Figure 5:
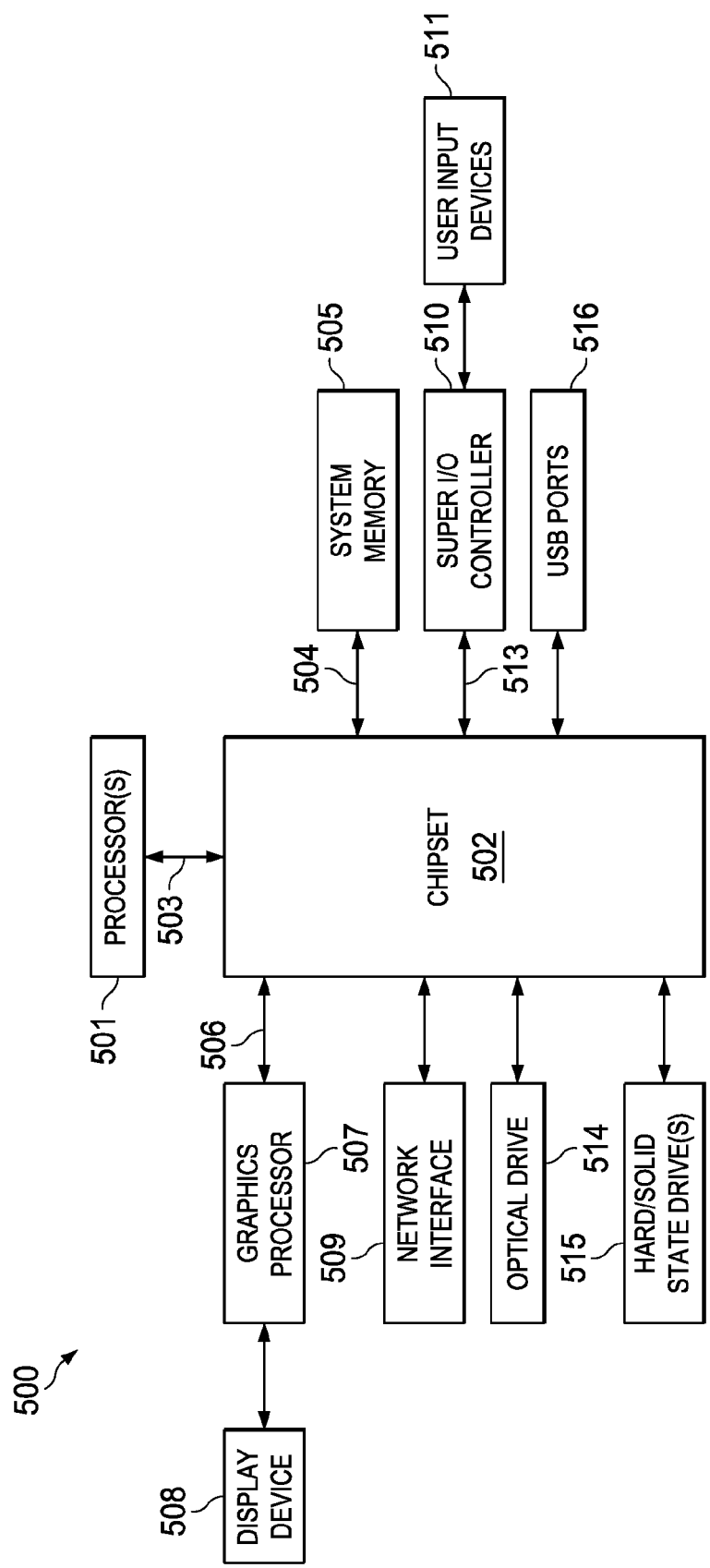

FIG. 5 is a block diagram illustrating certain components of a communication processing system used to implement a voice communication system according to various embodiments.

DETAILED DESCRIPTION

The invention now will be described more fully hereinafter with reference to the accompanying drawings. This invention may, however, be embodied in many different forms and should not be construed as limited to the embodiments set forth herein. Rather, these embodiments are provided so that this disclosure will be thorough and complete, and will fully convey the scope of the invention to those skilled in the art. One skilled in the art may be able to use the various embodiments of the invention For example, various types of controlled-environment facilities are present in today's society, and persons may be voluntary or involuntary residents of such facilities, whether temporarily or permanently. Examples of controlled-environment facilities may include correctional institutions (e.g., municipal jails, county jails, state prisons, federal prisons, military stockades, juvenile facilities, detention camps, home incarceration environments, etc.), certain healthcare facilities (e.g., certain hospitals and nursing homes, certain mental health facilities, certain rehabilitation facilities, such as drug and alcohol rehabilitation facilities, etc.), certain restricted living quarters (e.g., barracks, certain dormitories, etc.), and the like. For convenience of explanation, various examples discussed herein are presented in the context of correctional facilities, or the like. For instance, in some of the embodiments discussed below, a controlled-environment facility may be referred to as a correctional facility, jail or prison, and its residents may be referred to as inmates, arrestees, or detainees. It should be understood, however, that the systems and methods described herein may be similarly applicable to other types of controlled environment facilities and their respective residents (e.g., a hospital and its patients, a school dormitory and its students, etc.).

FIG. 1 is a diagram illustrating certain components of a voice communications system 100 provided within a controlled environment facility 110 according to various embodiments. As illustrated, the voice communications system 100 includes a communications processing system 105. In a controlled-environment facility 110, the communications processing system 105 may be a system that provides inmates with an array of communications services. For instance, communications processing system 105 may provide inmates with voice visitation services, video visitation services, email, online chats and/or messaging services. In certain embodiments, the provided messaging service is a text message service. In certain other embodiments, the communications processing system 105 may alternatively or additionally utilize various other messaging capabilities such as provided by a social networking service, for instance the messaging capabilities provided to FACEBOOK account holders. In certain embodiments, the communications processing system 105 may be configured to utilize push notifications for transmitting messages to configured communication applications.

In some scenarios, such as the embodiment illustrated in FIG. 1, communications processing system 105 may be co-located within a controlled-environment facility 110. Alternatively, communications processing system 105 may be centrally and/or remotely located with respect to one or more controlled-environment facilities. Whether co-located or located remotely, communications processing system 105 may be used to provide communication services to inmates of multiple controlled-environment facilities. As described with respect to FIG. 5, in various embodiments, communications processing system 105 may assume a variety of forms.

In certain embodiments, residents of a controlled-environment facility 110 may use conventional telephones 115 to access certain voice communication services provided by the communications processing system 105. In various scenarios, conventional telephones 115 may be provided only to certain residents and/or in certain visitation areas provided by the controlled-environment facility 110. In certain embodiments, certain voice calls by staff of the controlled-environment facility 110 may be conducted using conventional telephones 115 that also utilize the communications processing system 105.

In many embodiments, the communications processing system 105 may provide residents of the controlled-environment facility 110 with voice communication services using a resident communications terminal 120. In certain scenarios, the resident communications terminal 120 may be mounted on a wall, within a booth, or as part of kiosk. In certain scenarios, the resident communications terminal 120 may be a hardened terminal and may be installed in an area of the controlled-environment facility 110 dedicated to providing residents with visitation sessions. In certain embodiments, resident communications terminal 120 may provide a resident with the ability to place voice calls and to participate in video visitation sessions. In certain embodiments, such a resident communications terminal 120 may be referred to as an Intelligent Facility Device (IFD), which may be a video phone particularly adapted for use in a controlled-environment facility. An IFD may be adapted to provide residents with various additional services in addition to voice and video visitation sessions.

In various embodiments, a resident communications terminal 120 may include a video display, a camera, and a handset that includes a microphone and speakers. The display may be any suitable electronic display such as, for example, a Liquid Crystal Display (LCD) or a touchscreen display (e.g., resistive, capacitive, etc.). The camera included on the resident communications terminal 120 may be any suitable imaging device such as, for instance, a video camera or webcam equipped with Charge-Coupled Devices (CCDs), Complementary Metal-Oxide-Semiconductor (CMOS) active pixel sensors, etc. A handset may be similar to a traditional telephone handset including an earpiece portion (with a speaker), a handle portion, and a mouthpiece portion (with a microphone). In certain embodiments, the resident communications terminal 120 may allow a resident to utilize a headset with earphones and a microphone in place of a traditional handset.

Resident communications terminal 120 may be configured to capture audio from the resident and transmitting the captured audio to a non-resident via the communications processing system 105. The resident audio may be captured using a microphone in the mouthpiece portion of the handset or by a microphone component of a headset. The resident communications terminal 120 receives an audio signal from the non-resident, via the communications processing system 105, and plays the received audio for the resident using the earpiece portion of the handset. In certain resident communications terminals 120, audio received from the non-resident may be played for the resident via a speaker or via earphones. During a video visitation session, resident communications terminal 120 may be configured to capture video or images of the resident using the camera and, via the communications processing system 105, transmit the captured video or images to a non-resident. Resident communications terminal 120 may be further configured to display video or images received from non-resident communication device 145 via the communications processing system 105.

In certain embodiments, the communications processing system 105 may provide residents of the controlled-environment facility 110 with voice communication services using a portable communications device 125. In certain embodiments, portable communications device 125 may be a personal wireless devices, such as a tablet computing device or smartphone device. Similar to the resident communications terminal 120, the portable communications device 125 may likewise include a camera, display, microphone and speakers and may be used both for voice visitation sessions and video visitation sessions. In certain scenarios, a portable communications device 125 may be referred to as an Intelligent Resident Device (IRD), or in a correctional institution environment, as an Intelligent Inmate Device (IID). In certain scenarios, a portable communications device 125 and/or a resident communications terminal 120 may be sponsored, or otherwise subsidized, by organizations or companies that have contracted with the controlled-environment facility 110 to provide communication services to residents of the facility.

In many scenarios, the portable communications device 125 may be especially adapted for use in controlled-environment facility. For instance, in a correctional facility, the portability of a portable communications device 125 may be limited by mounting the device on a wall, within a booth or as part of kiosk. In certain scenarios, the portable communications device 125 may be protected within a hardened case that prevents any modifications to the hardware of the device. Various features of the hardware and/or software of the portable communications device 125 may be modified in order to prevent unauthorized use of the device. For instance, in a correctional institution, a portable communications device 125 may operate using a specially adapted operating system or operating system kernel. A portable communications device 125 may also be restricted with respect to the allowed software applications that may be used by a resident. The portable communications device 125 may also be configured to prevent the resident from installing or modifying any applications on the device, thus limiting the resident to the use of software programs authorized for use by the controlled-environment facility 110. The portable communication device 125 may be assigned for use by a resident on a temporary or permanent basis.

In various scenarios, a portable communications device 125 and/or a resident communications terminal 120 may provide a resident of the controlled-environment facility 110 with access to various software applications and services in addition to providing voice and video visitation sessions. For example, residents may be provided with legal research service, education services, employment search services, supervised email access, supervised online chat session, applications for playback of approved music and video files and/or supervised messaging. In certain scenarios, a portable communications device 125 and/or a resident communications terminal 120 may provide a resident with access to commissary services provided by the controlled-environment facility 110. In certain scenarios, portable communications device 125 and/or a resident communications terminal 120 may include a web browser which may be limited to only accessing secure websites and/or third party websites of approved vendors. Portable communications device 125 and/or a resident communications terminal 120 may also provide residents with access to various services specific to the controlled-environment facility 110, such as requesting a scheduled visitation session and requesting medical appointments.

A resident communications terminal 120 may also be restricted with respect to the network connectivity that is afforded to a resident of the controlled-environment facility. In many scenarios, a resident communications terminal 120 may be configured to only connect to a network provided by the controlled-environment facility 110. A resident communications terminal 120 may be further restricted to only connect to networks available within certain areas within a controlled-environment facility 110, such as a dedicated visitation area or other supervised area. In certain scenarios, network connectivity for a resident communications terminal 120 may be limited by placing wireless access points and positioning directional antenna within the physical structure of the controlled-environment facility 110 such that the generated wireless signals are restricted to limited areas within the facility.

In many scenarios, use of a resident communications terminal 120 and a portable communications device 125 is limited based on security protocols implemented by the controlled-environment facility 110. For instance, a resident may be required to enter a PIN (Personal Identification Number) before being allowed to use a resident communications terminal 120 or a portable communications device 125. A resident may similarly be required to provide biometric verification, such as using a voice print, fingerprint or other biometric indicator. Access to specific applications and services provided by a resident communications terminal 120 and a portable communications device 125 may also be limited to residents based on security protocols, thus requiring addition verification, such as a password, prior to allowing access to a resident.

In the illustrated embodiment, the communications processing system 105 utilizes the administration and management system 165 in enforcing security protocols that are applicable to the use of communication services provided to residents of the controlled-environment facility 110. For instance, in providing visitation services, communication processing system 105 may limit a resident's visitation sessions to sessions with non-residents whose identities are listed in that resident's Pre-Approved Contact (PAC) and/or Personal-Allowed Number (PAN) list. In some scenarios, the communications processing system 105 may also enforce restrictions prohibiting a resident from contacting certain individuals identified in a "do not contact" list. In various scenarios, the identity of a non-inmate may be identified based on the phone number of the non-resident, the device presented for use by a non-resident and/or the email addresses or other accounts used by the non-resident. Each resident's PAC, PAN, and/or do not contact list(s) may be stored, for example, in database 160 maintained by the administration and management system 165. In certain scenarios, database 160 may also be used to store biometric information used to authenticate individual residents of the controlled-environment facility 110. In addition to PAC, PAN, and/or do not contact list(s), administration and management system 165 may also store other security profiles and rules that are applicable to each resident.

The administration and management system 165 may also include a resident account management system 170 that is used to manage information such as balances in a resident's trust, commissary and/or calling accounts. The resident account management system 170 may also provide access to other information pertaining to a resident, including for instance a resident's trial schedule, conviction data, criminal record, sentencing data (such as time served, time remaining to be served, and projected release date), cell and cellmate assignments, resident-specific restrictions and warnings, commissary order history, telephone call history, call recordings, known or suspected gang or criminal affiliations, known or suspected affiliates, accomplices, or gang members; and any other information that may be relevant or useful to correctional facility staff to house and maintain residents. In various embodiments, the account management system 170 may be one or more separate systems, or may be integrated as a component of the administration and management system 165.

Using the communication services provided by the communication processing system 105, a resident may establish a voice communication session with one or more nonresidents. In certain scenarios, a resident may call a nonresident that is using a telephone 130 or other communication device via a Publicly Switched Telephone Network (PSTN) 135. Switch 140, in communication processing system 105, may be used to connect calls across PSTN 135. Additionally or alternatively, the non-resident may call a resident that is using a personal communication device 145, which may be a mobile phone, tablet computing device, a personal computer or other communication device. Calls to a resident using a personal communication device 145 may be connected through a network 150 such as an Integrated Services Digital Network (ISDN), Voice-over-IP (VoIP) network, or packet data network (such as, for example the Internet) and/or a wireless communications network. Router 155 of communication processing system 105 may used to route data packets associated with a voice communication with personal communication device 145. In certain scenarios, the personal communication device 145 used by the non-resident may include a camera, a display, a microphone and speaker, thus allowing the non-resident to participate in either voice or video visitation sessions with a resident of the controlled-environment facility 110.

In some implementations, communication processing system 105 may be configured to perform various monitoring operations related to visitation sessions. For instance, communications processing system 105 may be configured to allow staff to monitor live voice and video visitation sessions. In addition, communications processing system 105 may record communication sessions, such as by generating audio and/or video files of the visitation session. These recorded visitation sessions may be stored to the database 160 maintained by the administration and management system 165. In certain embodiments, communications processing system 105 may provide access to various tools that can be used to search the recorded visitation session in support of investigative activities.

In the illustrated embodiment, the communications processing system 105 includes a message service 175 that provides residents with voice messaging services according to various embodiments. As described, a resident may utilize the communication processing system 105 to request a voice communication with a non-resident. In situations where a resident initiates a call request to a non-resident and the non-resident is unable to take the call, the message service 175 provides residents with the ability to record a voice message to be made available to the non-resident. The message service 175 then provides the non-resident with the ability to retrieve the recorded voice message. In particular, the message service 175 dispatches a message to the communication device used by the non-resident, where this message includes a unique URL that directs the non-resident to a website where the recorded voice message can be retrieved and played by the non-resident.

In the embodiment of FIG. 1, the message service 175 is a component of the communication processing system 105. In certain embodiments, one or more of the functions of the message service 175 may be provided by systems external to the communication processing system 105. In certain of such embodiments, one or more of the functions of the message service 175 may be provided by centralized systems external to the controlled environment facility 110. One such embodiment is described with respect to FIG. 2.

In the embodiment of FIG. 2, the message service 210 provides the functions described with respect to the message service 175 of FIG. 1. As illustrated in FIG. 2, the message service 210 is external to the communications processing system 205. The message service is comprised of several components that interoperate to provide the described voice messaging service. In various embodiments, one or more the components of the message service 210 may rely on external systems to provide the described functionality. Additionally, various aspects of the functionality of the components of the message service 210 may be provided by the communication processing system 205 in various embodiments.

The message service 210 includes a call request system 225 that is used to issue a call request from a resident of the controlled environment facility to a non-resident. In the illustrated embodiment, a call request is received from the resident via the communication processing system 205 and is relayed by the call request system 225 to a non-resident using a portable communication device 215, such as a smartphone. In other scenarios, the portable communication device 215 utilized by the non-resident may be any communication device capable of voice communications and/or receiving messages. The call request system 225 dials the phone number of the non-resident device 215. If the call request system 225 determines that the call to the non-resident is not answered or is otherwise not accepted by the non-resident, the message recording engine 230 may be used to allow the resident to record a voice message to be left for the non-resident to retrieve. If the resident chooses, the message recording engine 230 captures a voice message and stores it to a repository 220.

Upon disconnecting the resident's call request, the message service 210 may utilize a notification engine 240 to generate and dispatch a text message to the non-resident device 215. In various embodiments, the text message may be sent using a SMS (Short Message Service) or a MMS (Multimedia Message Service). In certain embodiments, the notification engine 240 may utilize an external service in delivering text messages to the non-resident device 215. The text message generated by the notification engine 240 includes a unique URL (Uniform Resource Locator) link that directs the non-resident to website by which the voice message recorded by the resident can be retrieved and listened to by the non-resident. In various embodiments, the text message may also include information identifying the resident. In such embodiments, the notification engine 240 may receive information identifying the resident via the communication processing system 205 and may include certain identifying information in the generated text message.

In certain embodiments, the notification engine 240 may be configured to utilize notification messages other than or in addition to SMS and MMS text messages. For instance, in certain of such embodiments, the notification engine 240 may be configured to additionally or alternatively utilize other messaging services, such as messaging provided by a social networking account. In one example, the notification engine 240 may be configured to utilize FACEBOOK messaging to notify the non-resident that an inmate has a recorded a voice message for the non-resident. In such scenarios, the notification engine 240 may be configured to identify a social networking account associated with the non-resident. In certain embodiments, the notification engine 240 may be configured to access contact information for a non-resident via the communications processing system 205, where this contact information may include social networking account information for the non-resident. For instance, the communications processing system 205 may maintain contact information, such as FACEBOOK account information, for one or more non-residents that are associated with a particular resident. Using this contact information, the notification engine 240 may be configured to generate and/or dispatch a FACEBOOK message to a non-resident, where the message includes the unique URL directing the non-resident to the web-site for retrieving and listening to a recorded voice message. In certain embodiments, the notification engine 240 may be configured to generated and dispatch email notifications to the non-resident, where the email includes the unique URL for the recorded voice message. The notification engine 240 may also be configured to utilize push notification messages for transmitting the unique URL to a non-resident. Like the described use of social networking messages, the notification engine 240 may query the communications processing system 205 in order to determine whether email or push notification authorizations have been provided for a particular non-resident.

If the non-resident selects the link provided in the message, the link may first direct the non-resident to a payment system 245. In certain embodiments, all or part of the payment system 245 may be implemented using external systems, such as payment processing systems. If the non-resident provides payment via the payment system 245 or if payment is determined to not be required from the non-resident, the message retrieval engine 250 is used to retrieve the recorded message from repository 220 and to provide the message audio for playback by the non-resident device 215. In certain embodiments, the message retrieval engine 250 may provide the non-resident device 215 with temporary credentials that can be used to access the repository 220 directly in order to listen to the recorded voice message. In certain embodiments, the communication processing system 205 may access the repository 220 in order to determine whether a voice message recorded by an inmate was ever accessed by the non-resident. In certain embodiments, the message retrieval engine 250 may be configured to report each instance a voice mail is accessed by a non-resident to the communication processing system 205, which may make this information available for use in investigative purposes.

FIG. 3 is a flowchart diagram providing certain steps of a process according to various embodiments, where the process provides a resident of a controlled environment facility with the ability to record a voice message for a non-resident. The process begins at step 305 with the resident initiating the call request. Depending on the type of communication device being used by the resident and the policies of the controlled environment facility, the identity of the resident may require confirmation, for instance using a PIN or using biometric identifiers. The resident may then issue a call request by accessing voice communication services provided by a system such as the communication processing system 105, 205 described with respect to FIGS. 1 and 2.

At step 310, the communication processing system may prompt the resident for the identity of the non-resident that the resident seeks to call. In certain embodiments, the resident may be provided with an interface allowing the selection of contact information for non-resident that have been approved to participate in voice communications with the resident. The communication processing system may also verify that the resident is not prohibited from contacting the identified non-resident. In certain scenarios, the resident may be required to supply a phone number for the non-resident. In certain scenarios, manual assistance may be provided to the resident in identifying contact information for the non-resident. Upon providing the communication processing system with a phone number for the non-resident, the resident is effectively put on hold, in some cases by transferring the resident to a conference bridge, to which the non-resident will be transferred if the call request is accepted.

With the resident on hold, a call to the non-resident is initiated at step 315 using the phone number provided by the resident. In certain embodiments, a call request is made by message service 175, 210 described with respect to FIGS. 1 and 2. The message service dials the provided phone number and waits for an answer from the non-resident. If the non-resident answers the call request and accepts the call, at step 325, the voice visitation is conducted, in some cases by transferring the non-resident to the conference bridge where the resident's call remains holding.

If no answer to a dialed call is received before the expiration of a pre-determined time interval, the call request is determined as being unanswered by the non-resident. The time interval may be selected as sufficiently short in duration in order to prevent any voicemail system of the non-resident from answering the call request. In certain scenarios, the non-resident may answer the call request, but decline to take the call. In certain of such scenarios, the resident may nonetheless be allowed to record a voice message for retrieval by the non-resident. In certain embodiments, the message service may utilize an IVR (Interactive Voice Response) system for relaying the call request to a non-resident and determining whether the non-resident chooses to accept the call request. For instance, the IVR system may be used to notify the non-resident regarding the identity of the resident issuing the call request and the controlled environment facility in which the resident is being detained. If the user indicates a denial of the call request, the IVR system may then seek authorization for the resident to record a voice message for the non-resident to retrieve at a later time.

If the non-resident declines the call request and declines the offer for the resident to record a voice message for the non-resident, the IVR may provide the non-resident with the option to be added to a resident's "do not contact" list that is maintained by the controlled environment facility. Once the phone number of the non-resident is added to the list, the communication processing system may preclude the resident from issuing any further call requests to the non-resident.

If the resident does not answer or otherwise declines the call request, at step 330, the message service determines whether the device being used by the non-resident allows the non-resident to participate in the provided message service. In certain embodiment, the message service determines whether the communication device used by the non-resident can receive messages. In certain scenarios, such information may have been previously provided by the non-resident and may be stored in the contact information maintained by the communication processing system. In certain embodiments, the message service may rely on external systems to determine whether the non-resident's device is a cellular device, thus indicating that the non-resident's device may be capable of receiving text messages. In embodiments configured to utilize messaging provided by a service such as a social networking service, at step 330, the message service may determine whether the contact information maintained for a non-resident includes any social networking account information for the non-resident. At step 335, the message service may confirm that the resident is authorized to leave a voice message for the non-resident. In certain embodiments, a resident may be limited to leaving no more than a specified number of voicemails within a certain time window. A resident may likewise be prevented from leaving more than a specified number of voicemails to a particular non-resident within a certain time window.

If the resident is allowed to leave a recorded message for the non-resident and the non-resident is determined to have the ability to receive messages, at step 340, the resident may be provided with the opportunity to record a voice message that will be made available to the non-resident. In certain scenarios, the IVR system utilized by the message service provides the resident with instructions and restrictions pertaining to the voice message service. If the resident chooses, at step 345, the inmate records a voice message. In certain scenarios, the voice message may limited in duration based various factors, such as whether the cost for the voice message is being paid by the resident or will be paid by the non-resident upon choosing to hear the voice message. Once the voicemail is recorded, the audio of the voicemail may be analyzed using various tools, such as speech processing and keyword detection tools, in order to detect the presence of any illegal, unauthorized or otherwise suspicious activity.

In certain embodiments, the resident may be provided with ability to select from pre-recorded voice messages or computer-generated voice message to be left for retrieval by the non-resident. For instance, a resident may choose to leave a computer-generated message that identifies the resident and provides incarceration and bond information to the non-resident. In certain embodiments, certain residents may be limited to only leaving such pre-recorded or computer-generated voice messages and may thus be prohibited from providing a voice message spoken by the resident. In certain embodiments, such restrictions may be placed upon a resident based on a resident's privilege status within the controlled-environment facility.

The process of FIG. 3 continues in certain embodiments in FIG. 4 at step 405 where the message service begins the process of notifying the non-resident of the voice message recorded by the resident. In step 405, the message service generates the message to be sent to the non-resident. In certain embodiments, the generated message indicates that a voice message has been recorded by the resident for retrieval by the non-resident. The message may provide information identifying the resident that recorded the message and the controlled environment facility in which the resident is located. Also included in the message is a unique URL that directs the non-resident to a website from which the resident's recorded voice message can be retrieved and played. In certain embodiments, certain payment information for retrieving the voice message may be provided via the message to the non-resident.

At step 410, the generated message is dispatched to the non-resident at the phone number to which the call request was made by the message service on behalf of the resident. In certain embodiments, the message service may dispatch this message itself and in certain embodiments, the message service may rely on a third-party service in delivering the generated messages to the non-resident. At step 415, the non-resident receives the message and decides whether to utilize the provided link in order to access the voice message. In certain embodiments, the link provided in message expires after a specified duration has elapsed without the non-resident using the link to access the message. This duration may be determined based on various parameters, such as whether the non-resident has listened to prior voice messages left by the resident and based on whether the resident has paid a fee for providing access to the voice message. In certain embodiments, the link may be configured to expire after a recorded voice message has been played by the non-resident a specified number of times. For instance, a link to a recorded voice message may expire after the message has been played two times by the non-resident. In certain embodiments, the expiration of a link may be extended upon the non-resident clicking on the link and viewing the voice message retrieval web site, thus expressing a certain level of interest in listening to the voice message. If the non-resident does not choose to listen to the voice message before the expiration date of the message, at step 420, the voice message is deleted.

If the non-resident does select the link provided in the message prior to any expiration of the link, at step 425 the non-resident is directed to a system allowing the voice message to be retrieved. In certain embodiments, voice message retrieval is implemented at least in part by the message service 175, 210 described with respect to FIGS. 1 and 2. Upon reaching the voice message retrieval website associated with the unique URL in the provided link, the non-resident may be provided with instructional information regarding the retrieval of the voice message. In certain embodiments, retrieval of a voice message may require a payment by the non-resident. In such embodiments, the non-resident may be provided with a web page interface for entering payment information. In certain embodiments, non-residents may be redirected to a third-party payment system.

At step 430, the identity of the non-resident may be confirmed. In many controlled environment facilities, residents may be prohibited from contacting certain individuals. For instance, contact may be prohibited based on a restraining order issued by a court of law or to prevent possible witness tampering. In addition, residents may be prohibited from contacting certain non-residents due to criminal or otherwise unauthorized activities involving the resident and these non-residents. In light of such concerns, various forms of authentication may be required from the non-resident before access to a voice message is granted. In certain embodiments, a voice print of the user of the non-resident device may be captured and compared against authorized voice prints associated with the non-resident in order to ascertain whether the user of the non-resident device is a person that is allowed to communicate with the resident. In certain embodiments, the message service may verify that the communication device being used to access the voicemail retrieval system is the same communication device to which the message notification was dispatched. This prevents the recipient of the message from forwarding the link to an individual that is not allowed to communicate with the resident.

At step 435, the voice message recorded for the non-resident is retrieved and played for the non-resident. In certain embodiments, the message service may allow the non-resident to listen to the voice message for an unlimited number of times until the voice message is deleted. In certain embodiments, the message service may limit the number of times a non-resident can listen to a voice message before it is deleted. The duration of time the message service will maintain a voice message that has been accessed by a non-resident may be configurable based on various factors. In certain embodiments, a voice message may be stored longer by the message service based on payment by the resident or the non-resident. In certain embodiments, the availability of a voice message may be extended by the message service based on indications of past use of the voice message system by the non-resident.

The above embodiments have described a voice messaging system. Certain embodiments may instead utilize video messaging. As described, in certain controlled environment facilities, residents may be provided with communication devices and terminals that allow video to be recorded by the resident. In certain embodiments, the message service may be adapted to provide the resident with an opportunity to record a video message in response to a failed attempt to connect a voice call or a video call to a non-resident. As with the above described voice message system, the message service may send the non-resident a message including a unique URL directing the non-resident to web site through which the video message left by the resident may be accessed and viewed by the non-resident.

Referring to FIG. 4, at step 435, the recorded voice message is retrieved and played for the non-resident. In certain embodiments, this process of FIG. 4 will continue by providing the non-resident with the ability to record a reply voice message that will be made available to the resident. In such embodiments, once the resident's voice message has been played for the non-resident, the message service may provide the non-resident with instructions for recording a reply voice message. In certain of such embodiments, the non-resident may be asked to provide payment for leaving a reply voice message for the resident. In certain embodiments, the non-resident may be able to select payment for the reply voice message from a pre-configured account provided for the resident. In certain embodiments, the non-resident may instead provide payment by authorizing a charge to an account identified by the non-resident.

The message service may be configured to allow the resident to select parameters pertaining to the storage and availability of the reply voice message. For instance, the non-resident may be provided with the ability to select the duration for which the voice message will be stored by the message service and made available to the resident. The non-resident may also be provided with the ability to select the maximum number of times a reply voice message can be played by the resident prior to deletion of the reply voice message by the message service. In certain embodiments, the non-resident's may be provided with the ability to authorize larger payments for the reply voice message that allow the reply voice message to be stored longer by the message service and/or allow the reply voice message to be replayed more times by the resident.

In certain embodiments, a non-resident may be provided with the ability to record a voice message for a resident of a controlled-environment facility. In one embodiment, this capability is provided to non-residents using certain components of the message service 210 described with respect to FIG. 2. For instance, the message service 210 may be configured to receive voice calls from non-residents, where the voice calls are directed to the voice message recording components of the system. In many scenarios, residents of controlled-environment facilities are not provided any ability to receive voice calls. The message service 210 may, however, be configured to receive voice calls from non-residents and to offer the non-resident an opportunity to record a voice message for a particular resident. In addition to verifying the identity of the non-resident, the message service 210 may interoperate with the communication processing system 205 in order to verify that the non-resident is allowed to communicate with the resident. If the non-resident is allowed to record a voice message, the message recording engine 230 may be used to capture the voice message and store it to a repository 220.

As described above for voice messages recorded by residents, the message service 210 may utilize a notification engine 240 to generate and dispatch a text message or other message to a device that is being used by the resident. As described above, a resident of a controlled-environment facility may be provided with access to a communication terminal or the resident may be provided with a personal communication device, such as a tablet, on a temporary or permanent basis. These communication devices may be configured to allow residents to receive messages providing notification of a voice message and a unique URL by which the voice message may be accessed. In various embodiments, the message may be sent using a SMS text message, MMS message, FACEBOOK or other social network messaging and/or email. In some embodiments, the notification engine 240 may be configured to utilize push notification messages for transmitting a voice message notification to a resident. In various embodiments, the message may also include information identifying the non-resident that has recorded the voice message. In such embodiments, the notification engine 240 may receive information identifying the non-resident via the communication processing system 205 and may include information identifying the non-resident in the generated message.

As with the voice messages recorded by residents, notification of a voice message by non-residents is provided by the notification engine 240 including a unique URL in the message, where the URL directs the resident to a website by which the voice message recorded by the non-resident can be retrieved and listened to by the resident. The notification engine 240 may be configured to generate and dispatch email notifications to the resident, where the email includes the unique URL for the voice message recorded by the non-resident.

If the resident selects the link provided in the message, the link may first direct the resident to a payment system 245. If the resident provides payment or if payment is determined to not be required, the message retrieval engine 250 is used to retrieve the recorded message from repository 220 and to provide the message audio for playback by the resident. In certain embodiments, the communication processing system 205 may access the repository 220 in order to determine whether a voice message recorded by a non-resident was ever accessed by the resident. In certain embodiments, the message retrieval engine 250 may be configured to report each instance a voice mail is accessed by a resident to the communication processing system 205, which may make this information available for use in investigative purposes.

FIG. 5 is a block diagram of a communication processing system 500 configured according to certain embodiments to support the described voice messaging system. Communication processing system 500 may include one or more processors 501. In various embodiments, communication processing system 500 may be a single-processor system including one processor 501, or a multi-processor system including two or more processors 501. Processor(s) 501 may include any processor capable of executing program instructions, such as an Intel Pentium™ series processor or any general-purpose or embedded processors implementing any of a variety of Instruction Set Architectures (ISAs), such as the x86, POWERPC®, ARM®, SPARC®, or MIPS® ISAs, or any other suitable ISA.

Communication processing system 500 includes a chipset 502 that may include one or more integrated circuits that are connected to processor(s) 501. In certain embodiments, the chipset 502 may utilize a QPI (QuickPath Interconnect) bus 503 for communicating with the processor(s) 501. Chipset 502 provides the processor(s) 501 with access to a variety of resources. For instance, chipset 502 provides access to system memory 505 over memory bus 504. System memory 505 may be configured to store program instructions and/or data accessible by processors(s) 501. In various embodiments, system memory 505 may be implemented using any suitable memory technology, such as static RAM (SRAM), synchronous dynamic RAM (SDRAM), nonvolatile/Flash-type memory, or any other type of memory.

Chipset 502 may also provide access to a graphics processor 507. In certain embodiments, graphics processor 507 may be comprised within one or more video or graphics cards that have been installed as components of the communication processing system 500. Graphics processor 507 may be coupled to the chipset 502 via a graphics bus 506 such as provided by an AGP (Accelerated Graphics Port) bus, a PCIe (Peripheral Component Interconnect Express) bus. In certain embodiments, graphics processor 507 generates display signals and provides them to a display device 108 that may be coupled directly to the communication processing system 500 or may be located remotely from the communication processing system 500.

In certain embodiments, chipset 502 may also provide access to one or more user input devices 511. In such embodiments, chipset 502 may be coupled to a super I/O controller 510 that provides interfaces for a variety of user input devices 511, in particular lower bandwidth and low data rate devices. For instance, super I/O controller 510 may provide access to a keyboard and mouse or other peripheral input devices. In certain embodiments, super I/O controller 510 may be used to interface with coupled user input devices 511 such as keypads, biometric scanning devices, and voice or optical recognition devices. The user input devices 511 may interface with super I/O controller 510 through wired or wireless connections. In certain embodiments, the super I/O controller 510 may be coupled to the super I/O controller 510 via a Low Pin Count (LPC) bus 513.

Other resources may also be coupled to the processor(s) 501 of the communication processing system 500 through the chipset 502. In certain embodiments, chipset 502 may be coupled to a network interface 509, such as provided by a Network Interface Controller (NIC) that is coupled to the communication processing system 500. In certain embodiments, the network interface 509 may be coupled to the chipset 502 via a PCIe bus. According to various embodiments, network interface 509 may support communication via various wired and/or wireless networks. Chipset 502 may also provide access to one or more hard disk and/or solid state drives 515. In certain embodiments, the chipset 502 may also provide access to one or more optical drives 514 or other removable-media drives. Any or all of the drive devices 514 and 515 may be integral to the communication processing system 500, or may be located remotely from the communication processing system 500. In certain embodiments, the chipset 502 may also provide access to one or more Universal Serial Bus (USB) ports 516.

In various embodiments, a communication processing system 500 does not include each of the components shown in FIG. 5. In various embodiments, a communication processing system 500 may include various additional components in addition to those that are shown in FIG. 5. Furthermore, some components that are represented as separate components in FIG. 5 may in certain embodiments instead be integrated with other components. For example, in certain embodiments, all or a portion of the functionality provided by the illustrated components may instead be provided by components integrated into the one or more processor(s) 501 as a systems-on-a-chip.

The foregoing has outlined rather broadly the features and technical advantages of the present invention in order that the detailed description of the invention that follows may be better understood. It should be appreciated that the conception and specific embodiment disclosed may be readily utilized as a basis for modifying or designing other structures for carrying out the same purposes of the present invention. It should also be realized that such equivalent constructions do not depart from the invention as set forth in the appended claims. The novel features which are believed to be characteristic of the invention, both as to its organization and method of operation, together with further objects and advantages will be better understood from the following description when considered in connection with the accompanying figures. It is to be expressly understood, however, that each of the figures is provided for the purpose of illustration and description only and is not intended as a definition of the limits of the present invention.

What is claimed is:

1. A method for providing a resident of a controlled-environment facility with voice messaging, the method comprising:

receiving from the resident a request for a voice communication with a non-resident of the controlled-environment facility;

initiating a call request to the non-resident, wherein the call request is a dialed call directed to a phone number associated with the non-resident;

determining that the non-resident has not accepted the call request;

allowing the resident to record a voice message for the non-resident; and sending a notification of the voice message to the phone number associated with the non-resident, wherein the notification identifies the resident and wherein the notification includes a unique URL (Uniform Resource Locator) that directs the non-resident to a voice message retrieval system, wherein the unique URL is configured to function only when selected using a device that has been assigned the phone number associated with the non-resident.

2. The method of claim 1, wherein the voice message retrieval system is maintained by the controlled-environment facility.

3. The method of claim 1, wherein determining non-acceptance of the call request comprises failing to detect an answer to the dialed call within a predefined time interval.

4. The method of claim 1, further comprising:
determining whether the resident is allowed to communicate with the non-resident prior to initiating a call request to the non-resident.

5. The method of claim 1, wherein the notification comprises at least one of: an SMS (Short Message Service) text message, an MMS (Multimedia Message Service) message, a push notification, an email, and a social networking message.

6. The method of claim 1, wherein the unique URL expires after a predefined time interval.

7. The method of claim 1, wherein the notification identifies the controlled-environment facility and identifies the resident as a person that is incarcerated at the controlled-environment facility.

8. A system for providing a resident of a controlled-environment facility with voice messaging, the system comprising:
a call request system configured to receive from the resident a request for a voice communication with a non-resident of the controlled-environment facility; and further configured to initiate a call request to the non-resident, wherein the call request is a dialed call directed to a phone number associated with the non-resident; and further configured to determine that the non-resident has not accepted the call request;
a voice message recording engine configured to allow the resident to record a voice message for the non-resident;
a notification engine configured to send a notification of the voice message to the phone number associated with the non-resident, wherein the notification identifies the resident and wherein the notification includes a unique URL (Uniform Resource Locator) that directs the non-resident to a voice message retrieval system, wherein the unique URL is configured to function only when selected using a device that has been assigned the phone number associated with the non-resident; and
a message retrieval engine configured to respond to the selection of the unique URL by the non-resident by providing the non-resident the ability access the voice message.

9. The system of claim 8, wherein call request system, the voice message recording engine, the notification engine and the message retrieval engine are all maintained by the controlled-environment facility.

10. The system of claim 8, wherein determining non-acceptance of the call request comprises failing to detect an answer to the dialed call within a predefined time interval.

11. The system of claim 8, wherein the call request system is further configured to determine whether the resident is allowed to communicate with the non-resident prior to initiating a call request to the non-resident.

12. The system of claim 8, wherein the notification comprises at least one of: an SMS (Short Message Service) text message, an MMS (Multimedia Message Service) message, a push notification, an email, and a social networking message.

13. The system of claim 8, wherein the unique URL expires after a predefined time interval.

14. The system of claim 8, wherein the notification identifies the controlled-environment facility and identifies the resident as a person that is incarcerated at the controlled-environment facility.

15. A method for providing a resident of a controlled-environment facility with voice messaging, the method comprising:
receiving from the resident a request for a voice communication with a non-resident of the controlled-environment facility;
initiating a call request to the non-resident, wherein the call request is a dialed call directed to a phone number associated with the non-resident;
determining that the non-resident has not accepted the call request;
determining whether the resident is allowed to provide a spoken voice message;
if the resident is not allowed to provide a spoken voice message, allowing the resident to select an automated voice message for the non-resident; and
sending a notification of the voice message to the phone number associated with the non-resident, wherein the notification identifies the resident and wherein the notification includes a unique URL (Uniform Resource Locator) that directs the non-resident to a voice message retrieval system maintained by the controlled-environment facility, wherein the unique URL is configured to function only when selected using a device that has been assigned the phone number associated with the non-resident.

16. The method of claim 15, wherein determining whether the resident is allowed to provide a spoken voice message is based on a privilege status of the non-resident within the controlled-environment facility.

17. The method of claim 15, wherein the automated voice message comprises a computer-generated voice message that identifies the non-resident as an inmate of the controlled-environment facility.

18. The method of claim 17, wherein the computer-generated voice message comprises bail and incarceration status information relating to the resident.

* * * * *